United States Patent
Stamper et al.

(10) Patent No.: US 6,473,596 B1
(45) Date of Patent: Oct. 29, 2002

(54) CLOSE PROXIMITY TRANSMITTER INTERFERENCE LIMITING

(75) Inventors: Keith A. Stamper, Centerville, OH (US); Mark C. Calcatera, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/467,850

(22) Filed: Dec. 20, 1999

(51) Int. Cl.[7] .................................................. H03D 1/06
(52) U.S. Cl. ...................... 455/63; 455/279.1; 455/304; 455/303; 455/63; 455/295; 455/296; 342/19; 342/381; 375/348; 375/349; 375/351; 333/12
(58) Field of Search .................. 342/381, 19; 455/306, 455/63, 206, 307, 279.1, 303–304, 295–296; 375/348, 349, 351; 333/12; 340/19; 327/552

(56) References Cited

U.S. PATENT DOCUMENTS

| | | | |
|---|---|---|---|
| 3,621,401 A | * 9/1969 | Young, Jr. .................... 325/473 |
| 4,193,047 A | 3/1980 | Carter et al. |
| 4,408,350 A | * 10/1982 | Donath ........................ 455/206 |
| 4,613,978 A | * 6/1984 | Kurth et al. .................... 375/99 |
| 4,673,982 A | * 10/1984 | Tam et al. ................... 358/167 |
| 4,595,889 A | 6/1986 | Stitzer et al. |
| 4,952,193 A | * 3/1989 | Talwar ......................... 455/63 |
| 4,845,439 A | 7/1989 | Stitzer et al. |
| 4,994,740 A | * 9/1989 | Skuderal, Jr. et al. ......... 324/77 |
| 4,965,581 A | * 1/1990 | Skurdera, Jr. et al. ......... 342/19 |
| 5,125,108 A | * 2/1990 | Talwar ..................... 455/278.1 |
| 5,192,918 A | * 11/1991 | Sugiyama .................... 328/165 |
| 5,355,533 A | * 12/1991 | Dickerson .................... 455/306 |
| 5,410,750 A | * 2/1992 | Cantwell et al. ............. 455/306 |
| 5,424,674 A | * 11/1992 | Skudera, Jr. et al. ........ 327/552 |
| 5,221,912 A | 6/1993 | Keane et al. |
| 5,307,516 A | 4/1994 | Nomoto |
| 5,574,978 A | * 5/1994 | Talwar et al. .................. 455/63 |
| 5,339,057 A | 8/1994 | Rauscher |
| 5,355,091 A | 10/1994 | Albert et al. |
| 5,384,545 A | 1/1995 | Skudera, Jr. |
| 5,523,725 A | 6/1996 | Ishikawa et al. |
| 5,748,687 A | * 6/1996 | Ozluturk ..................... 375/367 |
| 5,923,228 A | 7/1999 | Okada et al. |
| 6,018,543 A | * 11/2000 | Blois et al. .................. 375/202 |
| 6,151,373 A | * 11/2000 | Dodley ........................ 375/348 |

OTHER PUBLICATIONS

Meriam–Webster's Collegiate Dictionary, Tenth Edition, copyright 1999, ISBN 0–87779–708–8, p. 963.*

* cited by examiner

Primary Examiner—Daniel Hunter
Assistant Examiner—Stephen D'Agosta
(74) Attorney, Agent, or Firm—Gerald B. Hollins; Thomas L. Kundert (57) ABSTRACT

A weaker signal receiving system inclusive of stronger nearby-sourced interference signal cancellation capability. Stronger interference signal cancellation is accomplished by actively canceling or subtracting from the received signal an intermediate signal in which the weaker signal has been attenuated but the stronger signal remains. Attenuation of the weaker signal in this intermediate signal is accomplished in a feedback loop arrangement by an amplitude-responsive signal processing element embodied from for example a ferrite material such as yttrium iron garnet disposed in a physical wave propagating and wave amplitude sensitive film. The cancellation or subtracting is accomplished using received signals and without need for a direct output sample of the stronger signal at its source. Military aircraft use of the disclosed system in the microwave and other spectral regions with transmission mode as opposed to reflection mode signal amplitude discrimination by the ferrite device is included.

22 Claims, 9 Drawing Sheets

CLOSE PROXIMITY TRANSMITTER INTERFERENCE LIMITING

RIGHTS OF THE GOVERNMENT

The invention described herein may be manufactured and used by or for the Government of the United States for all governmental purposes without the payment of any royalty.

BACKGROUND OF THE INVENTION

This invention relates to the field of radio frequency receivers and transmitters operating without disruptive signal interference in close physical proximity while located for example in an aircraft or other vehicle.

The conventional present day technique for providing continuous wave signal interference mitigation between a co-located or common platform radio frequency transmitter and receiver, in an aircraft setting for example, involves installing signal couplers in the transmission path between the transmitter and the transmitting antenna. Such couplers obtain a copy of a receiver-interfering strong transmitter signal for use in a signal subtraction or cancellation arrangement. This technique is represented generally in the FIG. 8 drawing herein. The copied strong transmitter signal is then provided with the proper phase and amplitude characteristics and coupled into the signal path between the receiving antenna and the receiver to achieve cancellation of the offending signal. Using this technique a significant amount of host platform, or e.g. host aircraft, characterization must be performed to install the signal suppression architectures. Common platforms requiring suppression of multiple offending transmitter signals in multiple receiver signal lines, will benefit from a better approach to interference mitigation.

SUMMARY OF THE INVENTION

The present invention provides active interference signal cancellation protection for a low level receiver operating near a transmitter antenna and provides this protection with a nonlinear ferrite element and without need to access a sample of the transmitter signal at its source.

It is an object of the present invention therefore to protect a radio receiver apparatus operating in the vicinity of a radio transmitter from transmitter-sourced interference signals.

It is another object of the invention to provide radio receiver protection from adjacent transmitter interference without requiring direct access to a transmitter signal.

It is another object of the invention to provide radio receiver protection from adjacent transmitter interference through use of receiver antenna-collected signals.

It is another object of the invention to provide radio receiver protection from adjacent transmitter interference by way of an adaptive signal cancellation-based signal processing algorithm.

It is another object of the invention to provide radio receiver protection from adjacent transmitter interference by way of introducing a frequency selective amplitude-sensitive nonlinear ferrite element into the generation of a transmitter interference-cancellation signal.

It is another object of the invention to provide radio receiver protection from adjacent transmitter interference by way of introducing an amplitude and frequency responsive nonlinear ferrite element such as yttrium iron garnet into the generation of a transmitter interference-cancellation signal.

It is another object of the invention to provide radio receiver protection from adjacent transmitter interference by way of introducing an amplitude and frequency responsive yttrium iron garnet ferrite element disposed in one of film form and spherical form into the generation of a transmitter interference-cancellation signal.

It is another object of the invention to provide radio receiver protection from adjacent transmitter interference in a manner providing low received signal loss.

It is another object of the invention to provide a system of radio receiver protection from adjacent transmitter interference usable in a co-located platform environment such as in a military aircraft.

It is another object of the invention to provide radio receiver protection from adjacent continuous wave, pulsed or frequency hopped transmitter interference.

It is another object of the invention to provide adaptive cancellation-based radio receiver protection from adjacent continuous wave, pulsed or frequency hopped transmitter interference.

It is another object of the invention to provide a radio receiver protection from adjacent transmitter interference arrangement usable over a frequency range such as 50 megahertz to 18 gigahertz.

It is another object of the invention to provide active mode low signal loss radio receiver protection from adjacent transmitter interference.

It is another object of the invention to provide an active interference cancellation algorithm for use with continuous wave transmitter interference signals.

Additional objects and features of the invention will be understood from the following description and claims and the accompanying drawings.

These and other objects of the invention are achieved by the method of receiving a weaker desired radio frequency signal in the presence of a nearby transmitter-sourced adjacent frequency strong interference signal, said method comprising the steps of:

generating a first electrical signal having both said weaker desired radio frequency signal and said nearby transmitter-sourced adjacent frequency strong interference signal as components thereof;

forming, in a first electrical signal-connected first path apparatus, a second electrical signal in which said weaker desired radio frequency signal component is attenuated with respect to said nearby transmitter-sourced adjacent frequency strong interference signal component;

subtracting, in a first electrical signal-connected second path apparatus, said second electrical signal from said first electrical signal to form a third electrical signal of suppressed nearby transmitter-sourced adjacent frequency strong interference signal content and substantially unaltered weaker desired radio frequency signal content;

applying said third electrical signal of suppressed nearby transmitter-sourced adjacent frequency strong interference signal content and substantially unaltered weaker desired radio frequency signal content to an input port of a radio receiver apparatus.

DETAILED DESCRIPTION

The purpose of the present invention is to provide a low complexity reduced cost large signal interference suppression capability for receivers co-located with or in near proximity to transmitters on, for example, a common platform. Active cancellation interference suppression using frequency selective ferrite devices, as disclosed, herein allows the suppression to be accomplished without disruption of a transmitter signal path thus making interference mitigation a platform independent procedure.

Figure 1:
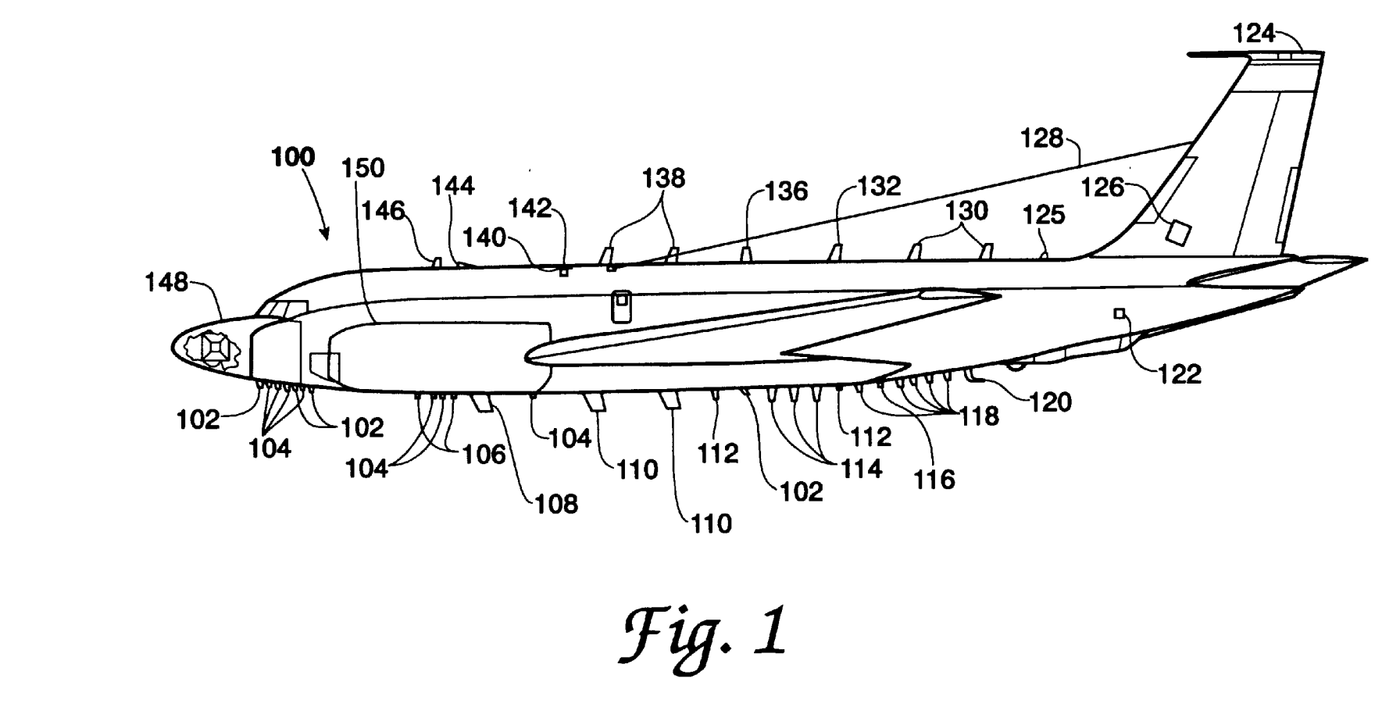
FIG. 1 shows a typical military aircraft together with several of the transmitting and receiving antenna locations often used in such aircraft.

In order to better appreciate the invention it is believed helpful to consider the military aircraft shown in the FIG. 1 drawing herein and the transmitter to receiver interference possibilities often found in such an aircraft. In the FIG. 1 drawing, a RC 135 reconnaissance military aircraft, as currently employed by the U.S. Air Force, is represented at 100 together with indications of multiple radio frequency energy transmitting and receiving antennas used in such aircraft. One engine of the FIG. 1 aircraft is indicated at 150 for reference. In the FIG. 1 drawing, for example, are represented multiple ultra high frequency and very high frequency (UHF and VHF) transmitter and receiver antennas as are used for communication and other mission related purposes on such aircraft. Such usage typically involves transmitter power levels of 100 watts and frequencies in the 20 to 500 Megahertz range.

Without delving into great and probably unneeded detail, the multiple antennas shown on the FIG. 1 aircraft 100 include the four aircraft underside-mounted UHF mucels antennas indicated at 102, the seven aircraft underside-mounted P band antennas 104, the two aircraft underside-mounted AT741 system antennas 106, the single aircraft underside-mounted AT256 system antenna 108 and the three aircraft underside-mounted mucels system VHF low band antennas 110. Additionally appearing on the FIG. 1 aircraft 100 are the three aircraft underside-mounted AT1076 system antennas 112 (two antennas being located in the rightmost 112 position of FIG. 1), the three aircraft underside-mounted mucels system VHF high band antennas 114, the mucles system test antenna 116, the four aircraft underside-mounted muscles system UHF antennas 118, the aircraft underside-mounted mucels all band antenna 120 and the aircraft side mounted G369 system antenna 122.

Additionally appearing on the FIG. 1 aircraft 100 are the rudder top mounted JTIDS antenna 124, the rudder heel mounted patch antenna 126, the aircraft fuselage top-mounted CHF9 (IDM) antenna 125, the short-wave long wire antenna 128, the aircraft fuselage top-mounted SATCOM UHF antennas 130, 132 and 138, the UHF1/VHF1 antenna 136, the aircraft fuselage top right-mounted and top left mounted UHF3 and UHF5 antennas 142 and 140 and the AIMS IFF AT741 antenna 144. Other antennas mounted on the aircraft 100 include the ultra high frequency/very high frequency transmitter antenna 146 and a plurality of radar and other antennas received in the aircraft nose cone radome 148. Some of the signals communicating by way of the FIG. 1 antennas may be of a frequency hop, pulsed, spread spectrum, or other non-simple signal nature.

With the FIG. 1 illustrated numbers of transmitting and receiving antennas in frequent simultaneous use on certain military aircraft and indeed with some of the same antennas and systems being present in airline and corporate aircraft and in other civilian aircraft it is not difficult to recognized that interference between concurrently operated radio frequency transmitter and receiver equipment is to be expected. Such concurrent operation and real time data communication are a necessity for the mission of a FIG. 1 type of aircraft. Transmitter to receiver interference can therefore result from such real world occurrences as lower level parasitic oscillations and harmonic frequency signals being present in a transmitter signal, from the Fourier components of a pulse modulated signal, from signal leakage events along coaxial and other transmission lines, from equipment grounding difficulties and from other mechanisms. The limited availability of antenna shielding by aircraft parts, the limited physical separation of antennas achievable in the confines of an aircraft and the omni directional field strength patterns attending many antennas increase the tendency toward interference in the FIG. 1 aircraft. The use of wideband signal frequencies, adjacent frequencies or harmonically related frequencies also increases the tendency toward interference in the FIG. 1 aircraft and increases the magnitude of interfering signals. Such interference is not limited to aircraft mounted equipment and is often encountered in ships, ground vehicles, spacecraft (i.e., in "fluid supported" vehicles) and in small platform fixed-site situations as often occur at a military base, at airports and in other locations. The instant invention addresses an active arrangement for elimination of these interferences.

Figure 8:
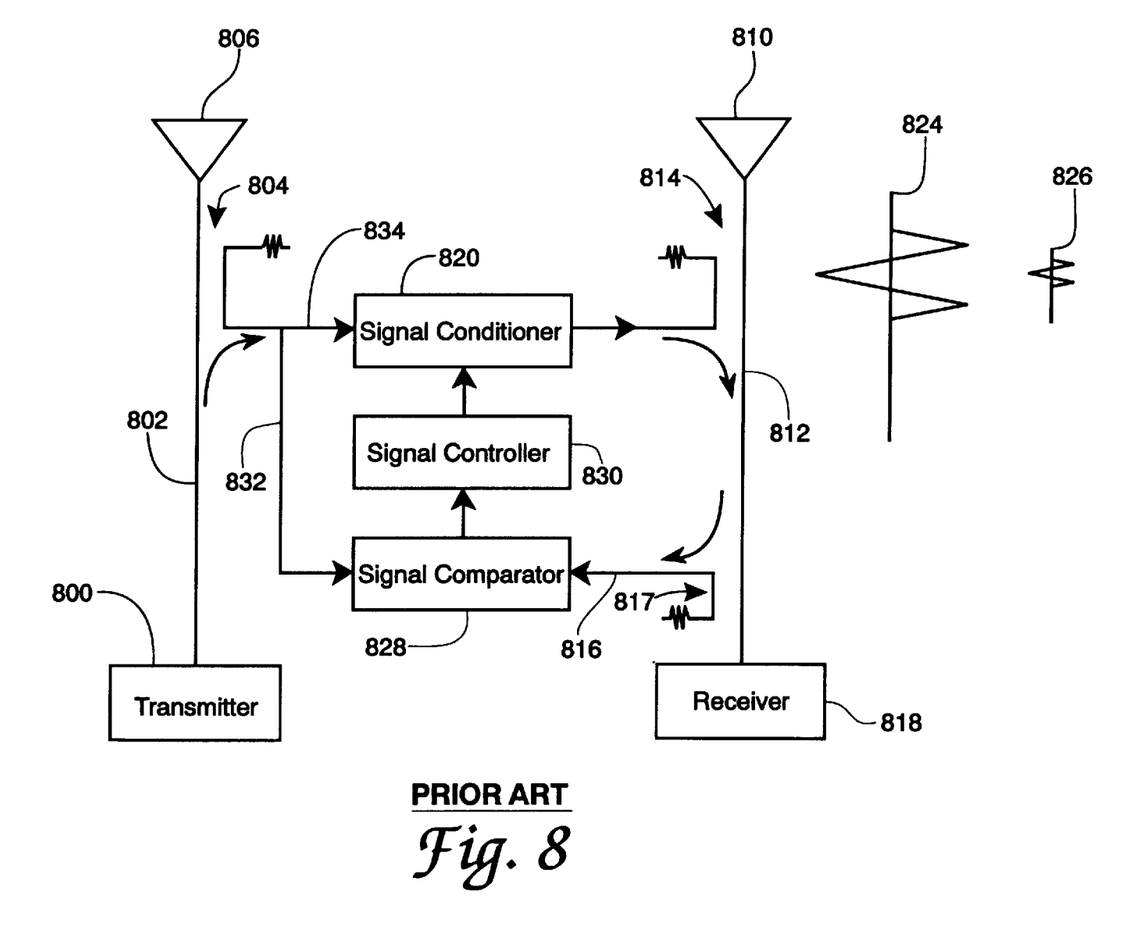
FIG. 8 shows a prior art strong signal interference suppression arrangement.

As recited above, the present day conventional technique for providing interference mitigation between common platform radio frequency transmitter and receiver apparatus involves installing a signal coupler in the energy path between a transmitter and the associated transmitting antenna as is illustrated in the FIG. 8 prior art drawing herein. Such couplers, as represented at 804 in FIG. 8, obtain a copy of the receiver-offending transmitter signal from some point along a transmission line 802 between transmitter 800 and antenna 806. The copied transmitter signal is split into two parts and one of these parts is provided to the block 820 signal conditioner through transmission line 834. The other part is provided via transmission line 832 to block 828, the comparator. Simultaneously an error correction signal from transmission line 816 and coupler 817 is provided for signal comparison in block 828. The comparator data is presented to block 830, the signal controller, for conversion from its I and Q data form to phase and amplitude information. This information is then sent to block 820 to maintain the desired phase and amplitude in the offending interference signal provided by the transmission line 834 and conditioned in the block 820 conditioner. The copy of the offending signal (with proper amplitude and phase characteristics) is then injected into the receive path of transmission line 812 by the coupler 814 to prevent the interfering signal received at antenna 810 from entering the receiver 818.

In contrast with the FIG. 8-represented conventional signal cancellation technique, the present invention achieves signal suppression or cancellation of unwanted transmitter signals of magnitude above some predetermined threshold without requiring historical knowledge of the offending interfering signals. The invention also obviates the need to signal sample the offending transmitter to obtain a copy of the unwanted signal. The present invention suppression utilizes the non-linear characteristics of a device such as a ferrite (e.g. a Yttrium Iron Garnet ferrite) and disposes this ferrite device in a feedback loop location where its characteristic (of converting both the interfering large signal and the desired small signal to heat energy) can be advantageously used.

Figure 2:
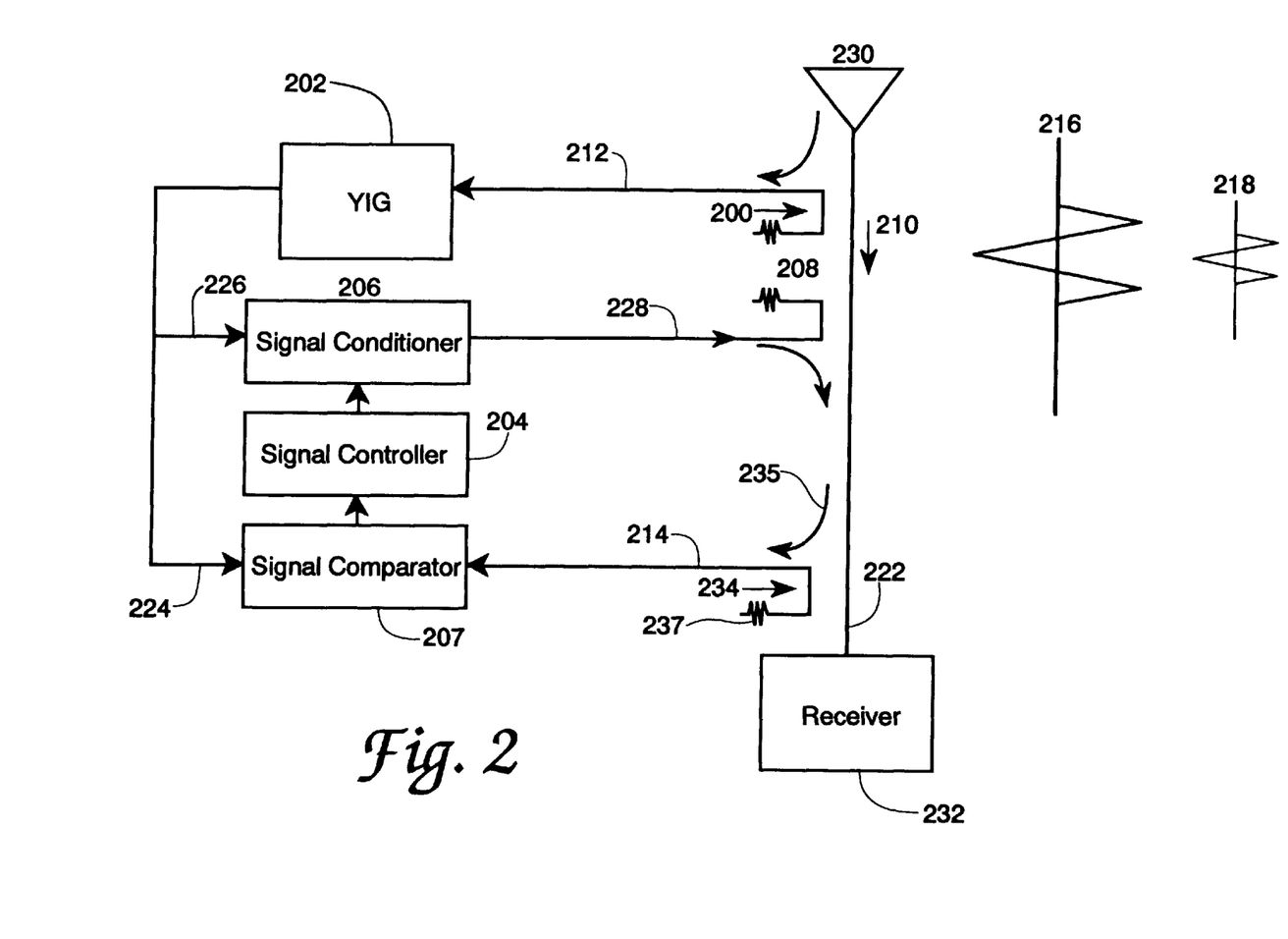
FIG. 2 shows an active cancellation strong signal interference suppression arrangement according to the present invention.

The present invention as is illustrated in the preferred embodiment of FIG. 2 couples a sample of both the offending (large) signal and desired (small) signal from the signal path 222 between the receiving antenna 230 and the low noise input amplifier of receiver 232 and feeds these signals into a signal separator device, a nonlinear ferrite device signal processor (e.g. a Yttrium Iron Garnet element) as represented at 202. The utilized characteristic of such a ferrite signal separator device 202 is that it provides for a signal magnitude threshold effect. An incoming signal above this threshold will pass through the nonlinear ferrite device separator with some attenuation. A signal below this threshold will nearly all be dissipated as heat. The offending passed-through signal is then amplified to the proper amplitude and phase adjusted 180 degrees. It is then coupled back into the receiver path to achieve subtractive cancellation of the undesired large signal. The below-threshold signal of interest passes through to the receiver front end with minimal attenuation.

FIG. 2 therefore shows a preferred arrangement of the present invention. The FIG. 2 apparatus represents a two path active cancellation signal processor usable between an antenna and a receiver in a transmitter interference environment such as that shown in FIG. 1 of the drawings. In FIG. 2 signals from the receiving antenna 230 communicate along the path 210 to the receiver 232 and signals derived from this antenna to receiver path in the coupler 200 communicate along the multiple component inclusive path 212. The signals appearing on path 210 are represented as the large and interfering transmitter signal 216 and the small and usually distally sourced desired receiver signal 218 in FIG. 2. A sample of each of these signals from coupler 200 is applied to a signal separator device 202 in which a ferrite element such as a film-disposed layer of yttrium iron garnet material is used to selectively propagate the combined signals according to a magnetostatic surface wave phenomenon.

Figure 4:
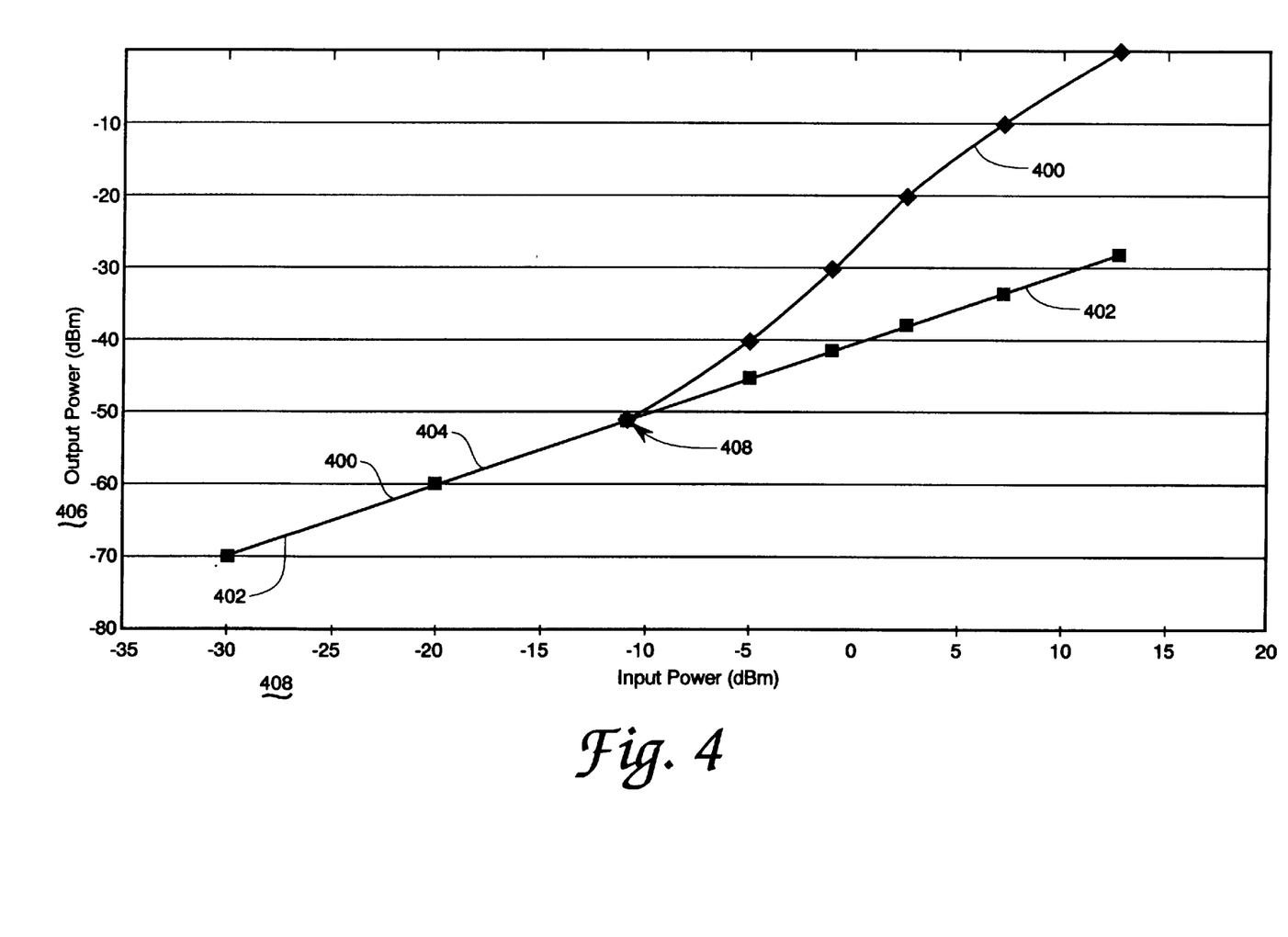
FIG. 4 shows a power transfer function relationship for a nonlinear material such as yttrium iron garnet usable in the present invention.

The transfer function of the YIG device in block 202 of FIG. 2 is nonlinear in nature and results in a signal amplitude-determined separation of large and small components of the composite signal from coupler 200. FIG. 4 in the drawings illustrates the nature of this amplitude responsive nonlinearity in a film-disposed ferrite material such as yttrium iron garnet. In FIG. 4 the varying power level range of an input signal is represented by the curve 402 which covers the input power range of −32 dBm to +13 dBm—as is measured along the horizontal scale 408. The output power level provided by the surface wave coupling of the ferrite device is represented by the curve at 400 in FIG. 4 and is measured on the scale 406. The curve 400 also extends from extreme left to right in the FIG. 4 drawing. The curves 400 and 402 appear coincident to the left of the point 408. The FIG. 4 output power curve 400 also covers the input power range from −32 dBm to +13 dBm and results in output power levels of −70 dBm to 0 dBm.

In the lower power level portion of the FIG. 4 curve 400 at the point 404, for example, there is little difference between the curves 400 and 402 and the curves coincide to show a nearly constant difference of −40 dBm between ferrite input and output power levels. Commencing at the threshold point 408 in FIG. 4, at an input power level of about −12 dBm and an output power level of −52 dBm, the increasing power level represented by the rightmost portion of the curve 402 input signal results in a nonlinear increasing response from the yttrium iron garnet material and significantly lower losses between input and output power levels ensues. At the FIG. 4 rightmost +13 dBm input power level point, for example, the power loss between input and output powers has decreased from −40 dBm to only about −13 dBm (i.e., an input power of +13 dBm on curve 402 provides a curve 400 output power of 0 dBm).

The FIG. 2 yttrium iron garnet element 202 in responding according to the FIG. 4 curves in the presence of a composite signal having one component signal below the threshold point 408 and one component above the threshold point 408 essentially absorbs or converts to heat energy the smaller signal while passing the larger signal with significantly lower losses (losses which are easily compensated by amplification as included at 204 in FIG. 2). The resulting signal includes only the larger of the two signals at 216 and 218, i.e., the transmitter interference signal.

The yttrium iron garnet element of block 202 in FIG. 2 includes the customary magnetic bias flux provisions for a yttrium iron garnet element even though representations of such provisions are omitted from the FIG. 2 drawing. Additional details concerning such magnetic bias flux and the relationship between magnetic bias flux and the frequency response of a yttrium iron garnet element are disclosed in the U.S. Pat. No. 5,615,473 of M. Dydyk et al., a patent which is hereby incorporated by reference herein. Usable nonlinear characteristics are contemplated for the yttrium iron garnet element of the present invention over a frequency range of at least 50 megahertz to 18 gigahertz. Improved doping materials and techniques for the yttrium iron garnet material of block 202 are seen as a key to the achievement of wider range of frequencies for the yttrium iron garnet nonlinear characteristics.

The error feedback signal on path 214 in FIG. 2 is compared for magnitude and phase differences with the offending interference signal from transmission line 224 in the signal comparator 207. The error feedback signal on path 214 is derived in the directional coupler or coupler 234 from the difference between the injected cancellation signal of path 228 and the received large signal 216 entering the antenna 230 and appearing on the antenna to receiver path 210. The comparator data is presented to block 204, the signal controller, for conversion from its I and Q data form to phase and amplitude information. In the I and Q data form, I data is the in-phase comparator output and Q the quadrature comparator output. The direction of signal coupling for the directional coupler 234 of FIG. 2 is indicated by the coupler-adjacent arrow shown at 235, such arrows repeat for other drawing-illustrated couplers. The resistor shown at 237 in FIG. 2 represents a characteristic impedance termination or load for the directional coupler 234 and is also repeated for other couplers shown in the drawings.

The phase and amplitude information from the block 204 signal controller is sent to the signal conditioner of block 206 to maintain the desired phase and amplitude of the processed offending signal or cancellation signal output on transmission line 228, i.e., to maintain the desired phase and amplitude of the cancellation signal processed from the offending interference signal received on transmission line 226. The processed offending signal or cancellation signal on transmission line 228 is injected into the receiver path 210 via coupler 208 to prevent the undesired interfering signal received via antenna 230 from entering the receiver 232.

By way of the active interference cancellation two path signal processing shown in FIG. 2 including the amplitude selective "filter" provided by the yttrium iron garnet ferrite device of block 202, an interfering large transmitter signal impressed on the receiver antenna has been removed and precluded from saturating or otherwise blocking the input stage(s) of a receiver 232 while attempting to receive an adjacent frequency low level signal 218 arriving from a distant source. Notably this active interference cancellation is achieved in the FIG. 2 present invention apparatus through use of signals collected from the receiver antenna and without need for a sample of the offending transmitter signal obtained directly from the interfering transmitter or its output energy transmission line. The FIG. 2 active interference cancellation has also been achieved without need for the significant amount of host platform characterization needed with the conventional signal cancellation practiced prior to the present invention.

Since host platform characterization as used with conventional signal cancellation arrangements involves measuring distance separation between transmitters and receivers and determining actual energy levels attributable to offending transmitters in a receiver's input path along with accomplishing these activities for each channel where signal suppression is required, it may be appreciated that eliminating the need for such tedious characterization is a significant advantage of the present invention. The present invention allows a given receiver to maintain it's sensitivity in the presence of a co-located transmitter operating simultaneously.

Figure 9:
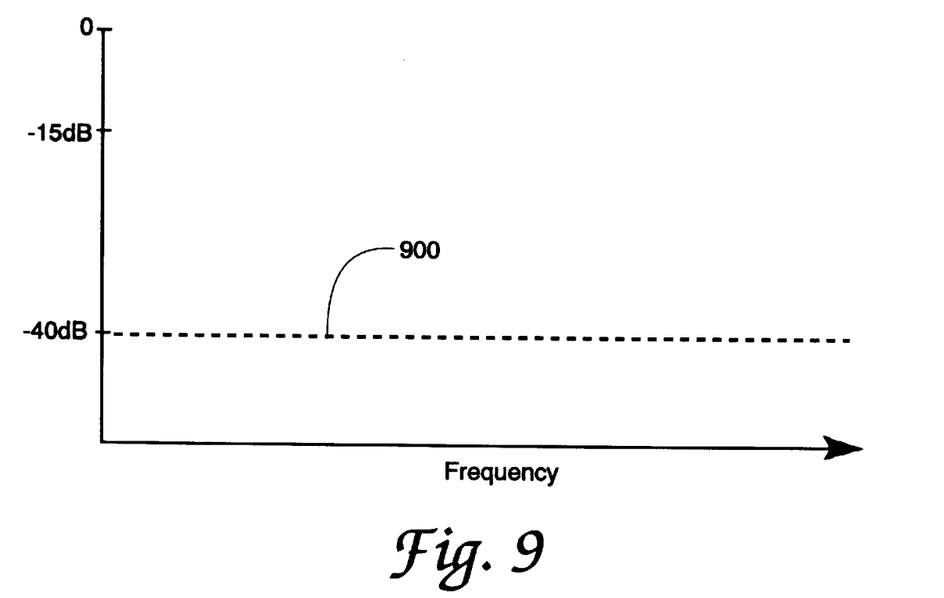
FIG. 9 shows typical small signal passband characteristics for a yttrium iron garnet signal enhancer device.
Figure 10:
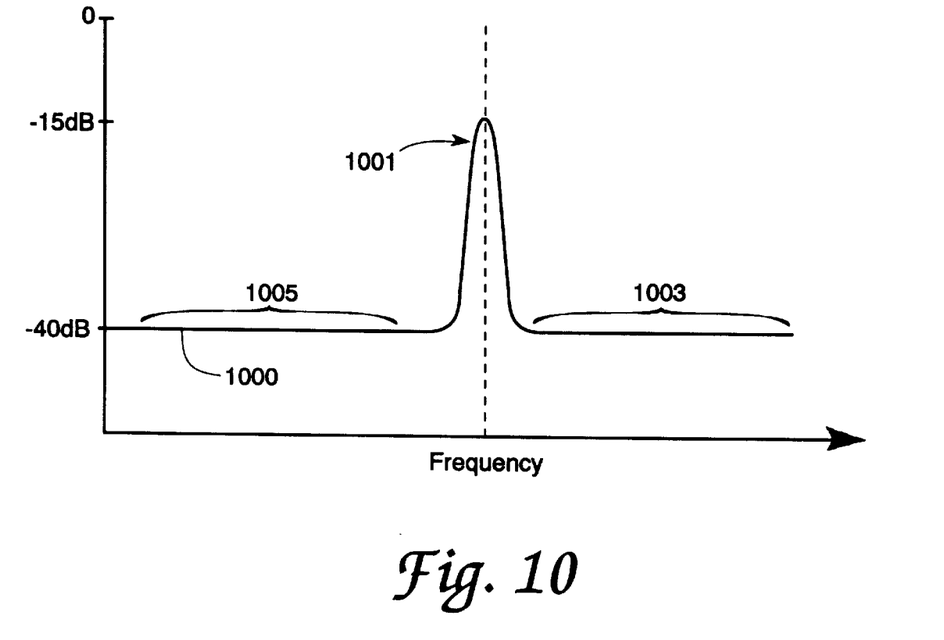
FIG. 10 shows typical above threshhold large signal passband characteristics for a yttrium iron garnet signal enhancer device.

FIGS. 9 and 10 of the drawings show the frequency versus attenuation passband characteristics provided by a yttrium iron garnet film signal enhancer of the type usable at 202 in the FIG. 2 drawing. In the presence of an input signal of amplitude below a −10 dBm threshold, the yttrium iron garnet device has a frequency independent, substantially flat passband characteristic as is shown in the FIG. 9 drawing. In the presence of an input signal sufficiently large to exceed a −10 dBm device threshold however the yttrium iron garnet film device provides the frequency selective, diminished attenuation characteristic represented at 1001 in FIG. 10. The diminished attenuation characteristic 1001 is found to be of about five megahertz in frequency width, of frequency location determined by the input signal frequency and also somewhat dependent on the yttrium iron garnet material's composition and construction. In applying the yttrium iron garnet film device represented in FIG. 10 to an apparatus of the FIG. 2 type it is, of course, preferable for the desired signals to be of a frequency located in the regions 1003 and 1005 i.e., located below or above the frequency of the diminished attenuation characteristic 1001. The −40 dB attenuation indicated at 900 in FIG. 9 and at 1000 in FIG. 10 is the typical attenuation encountered by a below-threshold signal applied to the yttrium iron garnet device.

Figure 3:
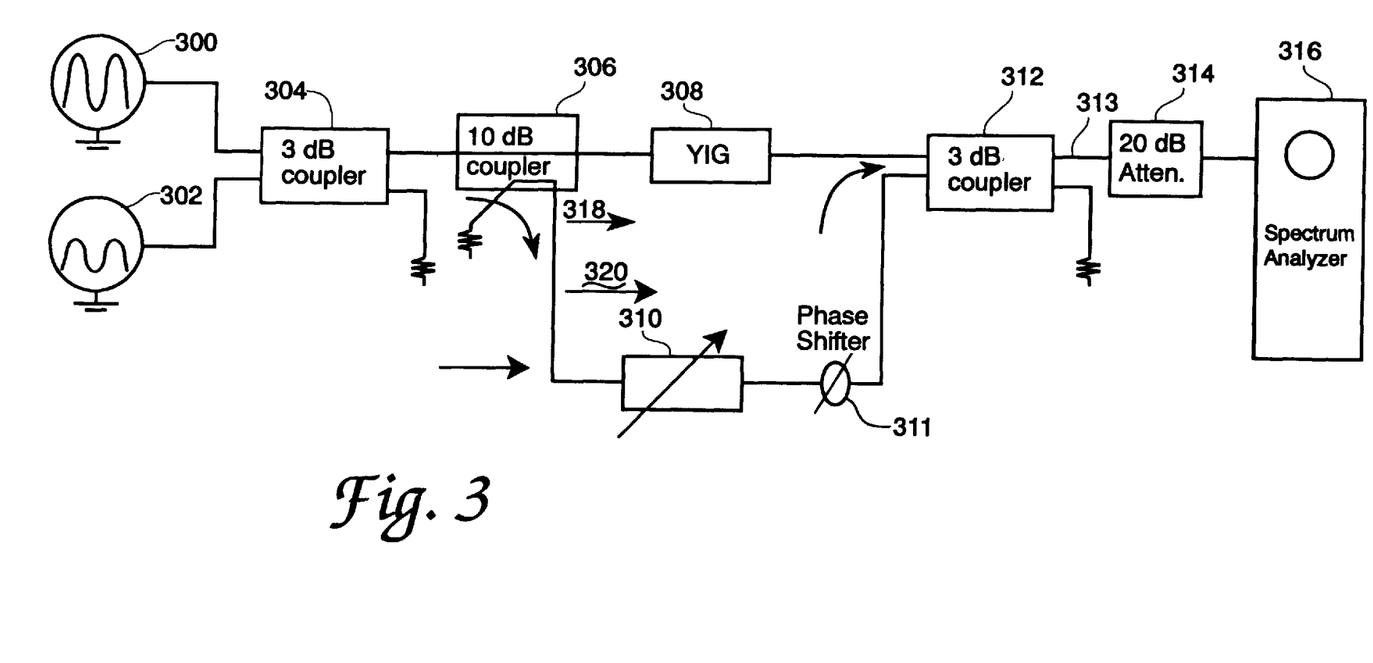
FIG. 3 shows a manually operable strong signal interference suppression laboratory simulation apparatus disposed according to the present invention.

FIG. 3 in the drawings shows in block diagram form a manually adjustable laboratory apparatus useful for achieving a controlled environment better understanding of the invention and its performance and capabilities. In the FIG. 3 drawing the large interfering transmitter signal and small desired signal are represented at 300 and 302 respectively and a 3 dB coupling circuit for these signals represented at 304. The two signal paths discussed in connection with the FIG. 2 drawing are represented at 318 and 320 in the FIG. 3 drawing and include the first path yttrium iron garnet signal separator "amplitude filter" of block 308 and the second path attenuator and phase shifter 310 and 311; these two paths are provided by a 10 dB coupler circuit represented by block 306. Notably in the FIG. 3 apparatus the direct path 320 signal is obtained by way of signal coupling in the 10 dB coupler 306 while the "indirect path" 318 signal is provided by an attenuated straight-through signal in the coupler 306. A second 3 dB coupler at 312 provides subtractive recombination of the FIG. 3 first and second path signals into an output signal appearing on path 313. A spectrum analyzer 316 and associated attenuator or amplifier devices as shown at 314 may be used to appraise the effectiveness of the FIG. 3 apparatus in removing large transmitter interference signals without significant effect on the processed signals.

Figure 5:
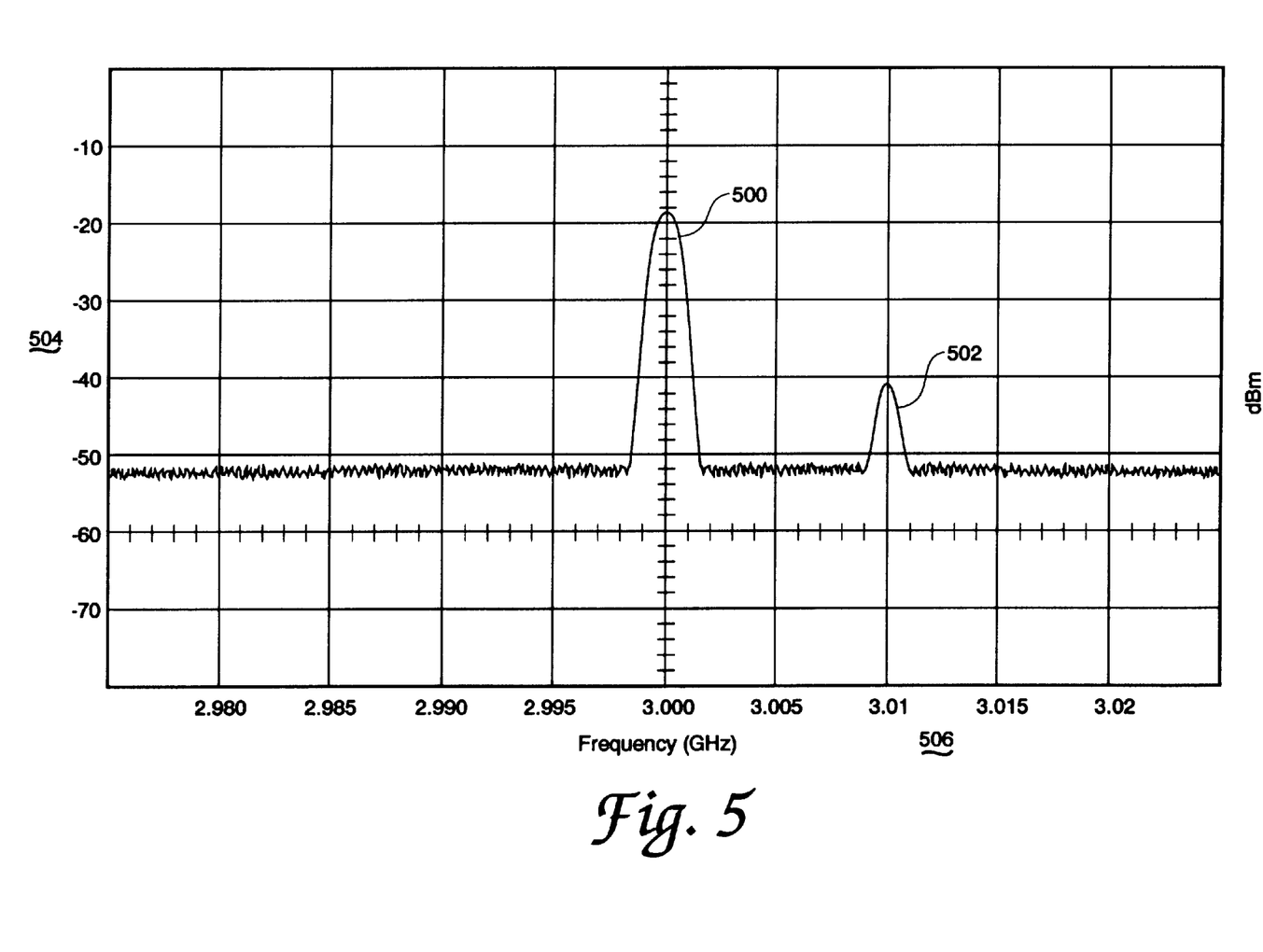
FIG. 5 shows an exemplary received signal relationship in a non amplitude responsive first signal path of the present invention.
Figure 6:
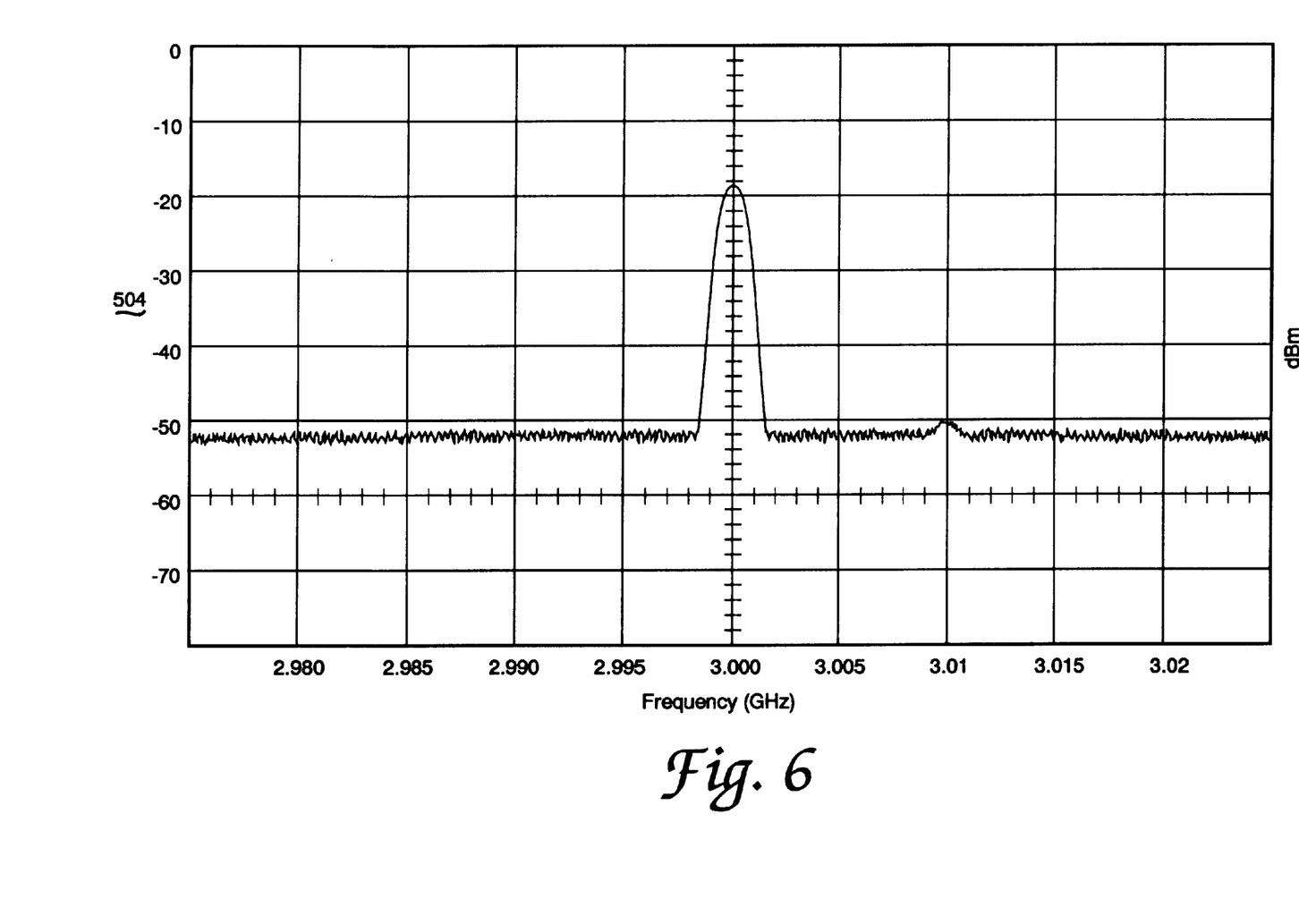
FIG. 6 shows a processed signal relationship in an amplitude responsive second signal path of the present invention.
Figure 7:
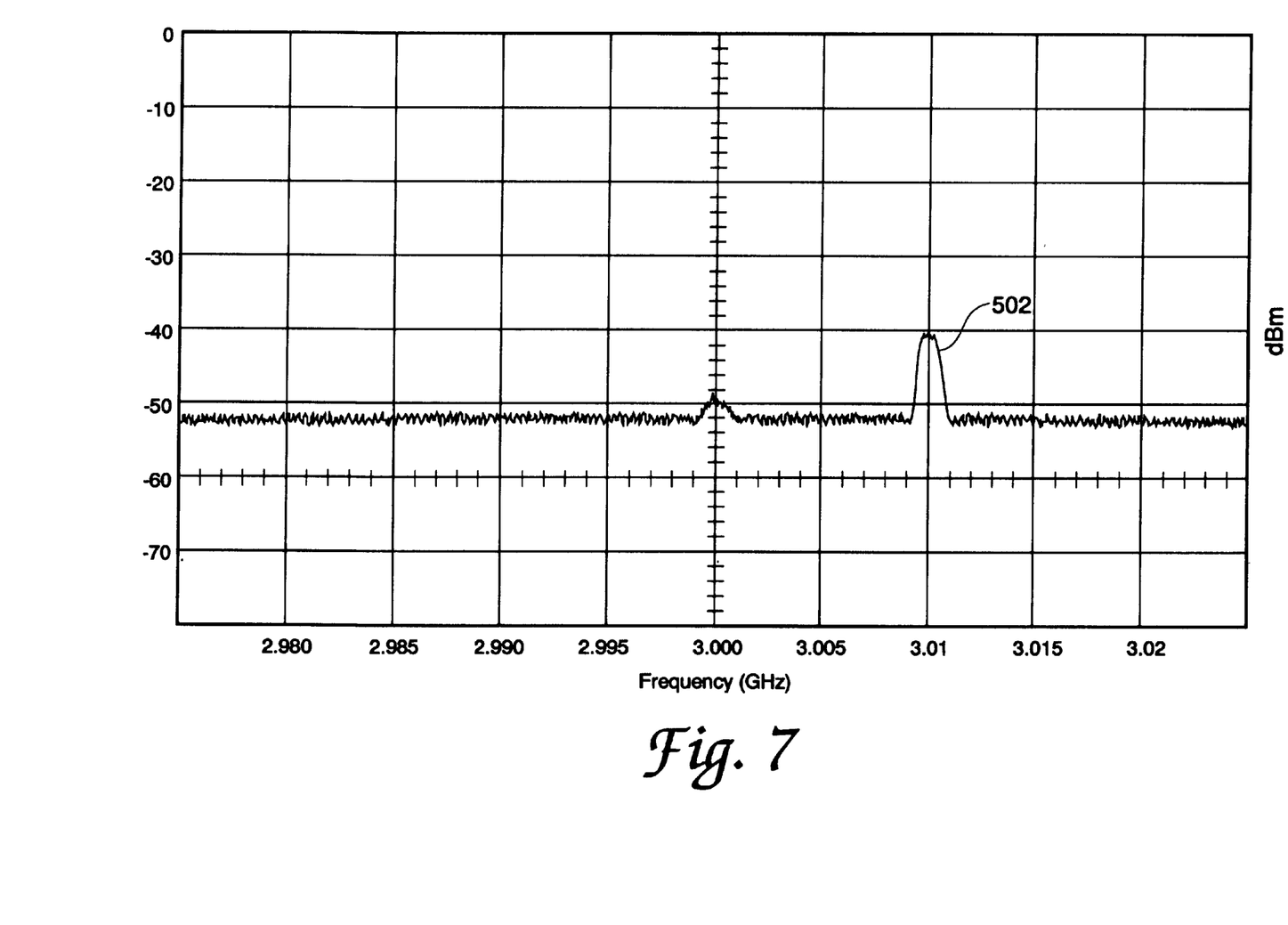
FIG. 7 shows a canceled signal relationship from a combination of FIG. 5 and FIG. 6 signals according to the present invention.

FIG. 5, FIG. 6 and FIG. 7 in the drawings show graphic representations of the performance of a signal cancellation apparatus according to the present invention as this performance is demonstrated by a simulation apparatus of the FIG. 3 manually-adjusted type. In these FIG. 5, FIG. 6 and FIG. 7 drawings each horizontal division represents a frequency change of 5.0 megahertz or 0.005 gigahertz with the center frequency being 3.000 gigahertz. Each vertical divisions in these drawings represents an amplitude change of 10.0 dB with the top most horizontal line representing a 0.0 dBm reference level. In the FIG. 5 drawing which represents signal along the direct channel path 320 in FIG. 3, and therefore is also representative of the composite input signal received from the output of the 3 dB coupler 304, a strong interference signal is represented by the center-most 3.000 gigahertz waveform at 500 and the desired lower level receiver signal is represented by the 20 dB lesser amplitude 3.01 gigahertz waveform at 502.

The FIG. 5 waveforms are applied to the yttrium iron garnet "amplitude filter" 308 in FIG. 3 where the desired lower level receiver signal represented at 502 in FIG. 5 is attenuated with respect to the strong interference signal at 500 by the above-described characteristics of the yttrium iron garnet film device. Phase adjustment of one FIG. 5 and FIG. 6 signal to enable their direct subtraction in the 3 dB coupler 312 is accomplished in the direct channel path 320 in FIG. 3; amplitude adjustment preparing for this subtraction is performed in the block 310.

The FIG. 6 yttrium iron garnet film-processed signal is subtracted from the FIG. 5 direct channel signal in the 3 dB coupler 312 in FIG. 3 to provide the output waveform represented in the FIG. 7 drawing. As illustrated in the FIG. 7 drawing the interfering waveform signal at 500 in FIG. 5 has been substantially removed by the FIG. 3 cancellation signal processing. The remainder portion of the interfering waveform signal at 500 in fact is shown in FIG. 7 to have an amplitude of only some 3 dB following the FIG. 3 signal processing. The waveforms of FIG. 7 as well as FIGS. 5 and 6 are obtained by way of the spectrum analyzer instrumentation indicated at 316 in FIG. 3. Signal level attenuation needed for adjusting signal magnitudes from levels compatible with the threshold of yttrium iron garnet device 308 to levels within range of the spectrum analyzer instrument 316 is provided in block 314.

The disclosed invention therefore is believed to provide a continuous wave transmitter interference signal cancellation arrangement especially useful in a small platform situation such as is encountered in an aircraft or other vehicle. The signal cancellation is accomplished in a two path signal processing in which signal separation is performed by attenuation of the desired small signal using a nonlinear ferrite device characteristic and a feedback arrangement.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. The method of receiving in a movable vehicle a weaker desired radio frequency signal in the presence of a same vehicle originating, adjacent frequency, strong interference signal, said method comprising the steps of:

generating a first electrical signal having both said weaker desired radio frequency signal and said same vehicle originating adjacent frequency strong interference signal as components thereof;

forming, in a first electrical signal-connected first path processing, a second electrical signal in which said weaker desired radio frequency signal component is attenuated by a signal amplitude-responding, threshold effect inclusive, yttrium iron garnet ferrite element with respect to said same vehicle originating adjacent frequency strong interference signal component;

subtracting, in a first electrical signal-connected second path processing, said second electrical signal from said first electrical signal to form a third electrical signal of subtraction altered suppressed same vehicle originating adjacent frequency strong interference signal content and less altered weaker desired radio frequency signal content;

applying said third electrical signal of subtraction altered suppressed same vehicle originating adjacent frequency strong interference signal content and less altered weaker desired radio frequency signal content to an input port of a radio receiver apparatus;

said generating, forming and subtracting steps being accomplished in non-saturating gain-free large dynamic range signal processing preceding said radio receiver apparatus.

2. The method of receiving a weaker desired radio frequency signal of claim 1 wherein said method further includes signal phase adjusting one of said first electrical signal and said second electrical signal prior to said subtracting step.

3. The method of receiving a weaker desired radio frequency signal of claim 1 wherein said step of generating a first electrical signal having both said weaker desired radio frequency signal and said interference signal as components thereof includes collecting a signal inclusive of said components from a receiving antenna disposed proximate a transmitter antenna source of said adjacent frequency strong interference signal component on said movable vehicle.

4. The method of receiving a weaker desired radio frequency signal of claim 1 wherein said signal components are of microwave frequency.

5. The method of receiving a weaker desired radio frequency signal of claim 1 wherein said weaker desired radio frequency signal is originating at a distant signal source.

6. The method of receiving a weaker desired radio frequency signal of claim 1 further including the step of accomplishing said steps of generating, forming, subtracting and applying within a moving vehicle.

7. The method of receiving a weaker desired radio frequency signal of claim 6 wherein said moving vehicle is a fluid supported vehicle.

8. The method of receiving a weaker desired radio frequency signal of claim 1 wherein said step of forming, in a first electrical signal-connected first path processing, a second electrical signal includes a signal history-free, real time amplitude responsive, signal attenuation algorithm.

9. The method of receiving a weaker desired radio frequency signal of claim 8 wherein said step of forming, in a first electrical signal-connected first path processing, a second electrical signal includes attenuating said weaker desired radio frequency signal in response to said strong signal component magnitude.

10. The method of receiving a weaker desired radio frequency signal of claim 1 wherein said step of forming, in a first electrical signal-connected first path processing, a second electrical signal includes attenuating said weaker desired radio frequency signal using a yttrium iron garnet signal magnitude responsive element having weak signal attenuating and greater signal passing threshold effect characteristics.

11. Reduced interference, limited physical extent common platform, radio frequency transmitter and receiver apparatus comprising the combination of:

a limited physical extent platform-disposed radio transmitter and first antenna connected therewith, said transmitter having a first radio frequency output signal;

a second antenna disposed on said limited physical extent platform and a radio frequency receiver connected therewith, said radio frequency receiver and said second antenna member being responsive to lower level input signals of a second radio frequency and undesirably responsive to input signals of said first radio frequency from said first antenna;

untuned, signal amplitude responsive, yttrium iron garnet signal processing apparatus of yttrium iron garnet signal magnitude threshold effect characteristics and having a first radio frequency signal and second radio frequency signal input from said second antenna and generating an output signal having an attenuated low level second radio frequency signal component and a lesser attenuated high level first frequency signal component;

signal cancellation apparatus having a first input node connecting with said second antenna and a second input node connected with said signal amplitude responsive yttrium iron garnet signal processing apparatus output signal and generating a difference output signal, a difference output signal connected with an input of said radio frequency receiver and, representative of an attenuated of said high level signal component and a lesser attenuated of said low level signal component.

12. The radio frequency transmitter and receiver apparatus of claim 11 wherein said limited physical extent platform comprises a movable vehicle.

13. The radio frequency transmitter and receiver apparatus of claim 11 wherein one of said first radio frequency signal and said second radio frequency signal comprise one of a varying amplitude and a varying frequency signal.

14. The radio frequency transmitter and receiver apparatus of claim 13 wherein one of said first radio frequency signal and said second radio frequency signal comprise a frequency hop signal.

15. The radio frequency transmitter and receiver apparatus of claim 11 wherein said first radio frequency signal and said second radio frequency signal comprise microwave frequency signals.

16. The radio frequency transmitter and receiver apparatus of claim 11 further including a signal phase changing element and a signal inversion element.

17. The radio frequency transmitter and receiver apparatus of claim 11 wherein said untuned signal amplitude responsive, yttrium iron garnet signal processing apparatus having a first radio frequency signal and second radio frequency signal input from said electrical signal source and generating an output signal having an attenuated low level second radio frequency signal component and a lesser attenuated high level signal component includes a present signal amplitude-responsive signal threshold effect attenuation algorithm.

18. The radio frequency transmitter and receiver apparatus of claim 11 wherein said untuned signal amplitude responsive, yttrium iron garnet signal processing apparatus having a first radio frequency signal and second radio frequency signal input from said electrical signal source and generating an output signal having an attenuated low level second radio frequency signal component and a lesser attenuated high level signal component includes a yttrium iron garnet film element characterized by a signal threshold effect-inclusive yttrium iron garnet attenuating algorithm having a first high attenuation response to a weak signal input and a second diminished attenuation response to a greater signal input that is above a threshold signal level.

19. Stronger signal suppressing, weaker signal-receiving radio frequency apparatus comprising the combination of:
   a radio transmitter antenna connected to a source of first radio frequency energy;
   a radio receiver antenna disposed in vehicle size limited close proximity with said radio transmitter antenna and generating a receiver antenna electrical signal inclusive of a desired second frequency weak signal component and a stronger first frequency interference component, an interference component originating in said radio transmitter antenna and said source of first radio frequency energy;
   a yttrium iron garnet film-inclusive first path signal processor of amplitude responsive, untuned, yttrium iron garnet signal magnitude threshold effect characteristics connected with said radio receiver antenna and generating a third electrical signal having first path signal processor-attenuated desired second frequency weak signal components with respect to lesser attenuated first radio frequency interference components;
   a subtractive second path signal processor connected with said radio receiver antenna and said yttrium iron garnet filter-inclusive first path signal processor and generating a difference electrical signal between said receiver antenna electrical signal and said third electrical signal having first path signal processor-attenuated second frequency desired weak signal components;
   a radio receiver having a signal input connected with said second path difference electrical signal.

20. The stronger signal suppressing, weaker signal-receiving radio frequency apparatus of claim 19 wherein said apparatus is contained within a military aircraft.

21. The stronger signal suppressing, weaker signal-receiving radio frequency apparatus of claim 19 wherein said first path signal processor and said second path signal processor together comprise a subtractive signal cancellation circuit.

22. The stronger signal suppressing, weaker signal-receiving radio frequency apparatus of claim 19 wherein:
   said apparatus is disposed on a military aircraft;
   said radio transmitter antenna and said radio receiver antenna are each mounted on said military aircraft and comprise portions of one of a radar apparatus, a communications apparatus and an electronic warfare apparatus;
   said radio transmitter antenna and said radio receiver antenna include radiation elements tuned to one of said first and second frequencies;
   said first and second frequencies comprise one of, millimeter wave, microwave, ultra high and very high frequencies;
   said weaker second frequency signals comprise signals received from a source external to said military aircraft;
   one of said first path and said second path signal processors includes signal phase and amplitude altering apparatus; and
   said yttrium iron garnet film-inclusive first path signal processor includes small signal attenuating and large signal lesser attenuating signal amplitude response characteristics.

* * * * *